United States Patent
Schmutz et al.

(10) Patent No.: US 6,547,188 B2
(45) Date of Patent: Apr. 15, 2003

(54) PROCESS AND DEVICE FOR INERTING AN AIRCRAFT FUEL TANK

(75) Inventors: Nicolas Schmutz, Grenoble (FR); Olivier Vandroux, Grenoble (FR)

(73) Assignee: L'Air Liquide, Societe Anonyme a Directoire et Conseil de Surveillance Pour L'Etude et L'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/128,297

(22) Filed: Apr. 24, 2002

(65) Prior Publication Data

US 2002/0158167 A1 Oct. 31, 2002

(30) Foreign Application Priority Data

Apr. 26, 2001 (FR) .............................................. 01 05631

(51) Int. Cl.$^7$ .............................................. B64D 45/00
(52) U.S. Cl. ...................... 244/135 R; 44/639; 55/310; 55/311; 60/277; 60/781
(58) Field of Search ................ 44/639, 637; 244/129.2, 244/135 R, 135 A, 135 B, 135 C, 136; 261/77, 93, 119.1, 121.1, 123, 124; 55/310, 311; 60/277, 281

(56) References Cited

U.S. PATENT DOCUMENTS

| | | | | |
|---|---|---|---|---|
| 3,561,414 A | * | 2/1971 | Schou ........................ 123/518 |
| 3,590,559 A | * | 7/1971 | Bragg et al. ................ 220/88.3 |
| 3,628,758 A | * | 12/1971 | Nichols .................... 244/135 R |
| 3,691,730 A | * | 9/1972 | Hickey et al. .............. 220/88.3 |
| 3,693,915 A | * | 9/1972 | Ulanovsky ............... 244/135 R |
| 3,732,668 A | * | 5/1973 | Nichols ....................... 220/88.3 |
| 3,788,039 A | * | 1/1974 | Bragg ........................ 220/88.3 |
| 3,788,040 A | * | 1/1974 | Bragg et al. ................ 220/88.3 |
| 4,152,374 A | * | 5/1979 | Wenger et al. ............... 261/124 |
| 4,378,920 A | * | 4/1983 | Runnels et al. ............. 137/209 |
| 4,556,180 A | * | 12/1985 | Manatt .................... 244/135 R |
| 6,136,267 A | * | 10/2000 | Bergman ................. 244/129.2 |
| 6,293,525 B1 | * | 9/2001 | Ginsburgh et al. ......... 220/88.3 |
| 6,343,465 B1 | * | 2/2002 | Martinov ................ 244/135 R |

FOREIGN PATENT DOCUMENTS

| | | |
|---|---|---|
| EP | 0 405 597 | 1/1991 |
| GB | 1 395 691 | 5/1975 |
| WO | WO 00 00389 | 1/2000 |

\* cited by examiner

*Primary Examiner*—Charles T. Jordan
*Assistant Examiner*—Stephen A Holzen
(74) *Attorney, Agent, or Firm*—Young & Thompson

(57) ABSTRACT

There is produced (at 2) air enriched in inert gas, from a source (9) of compressed air internal to the aircraft, and this enriched air is admitted (via 10) into the fuel tank (12). During the cruising phase of the aircraft, there is produced a first fraction of air having a first inert gas content, and this first fraction is admitted into the fuel tank (12) at a first flow rate. Moreover, during the descent phase, there is produced a second fraction of enriched air having a second inert gas content substantially less than the first content, and the second fraction is admitted to the reservoir (12) at a second flow rate substantially greater than the first flow rate.

12 Claims, 2 Drawing Sheets

PROCESS AND DEVICE FOR INERTING AN AIRCRAFT FUEL TANK

FIELD OF THE INVENTION

The present invention relates to a process and device for inerting an aircraft fuel tank.

The invention contemplates all kinds of aircraft, in particular airplanes and helicopters. It is applicable to any type of flight, whether civil or military.

BACKGROUND OF THE INVENTION

During the flight of an aircraft, there exists the continuous risk of ignition of the fuel vapors. The occurrence of this ignition can be reduced, by injecting into the reservoir an inert gas, permitting lowering the percentage of oxygen that is present there, below a predetermined value. Once this latter is reached, the mixture present in the reservoir is substantially no longer explosive. Such a process is for example described in WO-A-99/34 106.

It is also known to produce, on board the aircraft, air enriched in nitrogen or, in other words, impoverished in oxygen. Such a production is carried out by means of an apparatus relying on permeable membranes, or else on molecular sieves. This apparatus, which communicates with a source of compressed air internal to the aircraft, permits supplying, on the one hand, a fraction of air enriched in oxygen and, on the other hand, a fraction of output air enriched in an inert gas, particularly nitrogen. This latter fraction is injected into the reservoir, so as to render it inert.

This known solution however has certain drawbacks. Thus, to have complete protection, the fuel tank must be rendered inert during all of the flight. This requires providing apparatus for supplying air enriched in inert gas, whose weight and size are great, which correspondingly renders the aircraft heavier. Moreover, such apparatus is of high cost. Finally, it requires a significant consumption of air under pressure, which gives rise to a drop in the overall power of the aircraft, to the extent that this consumption limits the propulsion of it.

SUMMARY OF THE INVENTION

So as to overcome these various drawbacks, the invention proposes to practice a process which, whilst ensuring reliably rendering inert the vapor contained in the fuel tank, uses mechanical elements whose size and weight are reduced relative to the prior art, and which involves a lesser supply of compressed air than in the prior art.

To this end, it has for its object a process for inerting an aircraft fuel tank, in which there is produced air enriched in inert gas, from a source of compressed air internal to said aircraft, and said enriched air is admitted into the tank containing said fuel, in which, during at least one cruising phase of a flight of the aircraft, there is produced a first fraction of air having a first content of inert gas, and this first fraction is admitted into the reservoir at a first flow rate, and, during a descent phase of said flight, there is produced a second fraction of enriched air, having a second content of inert gas, substantially less than that of the first content, and there is admitted into the fuel tank the second fraction and ambient air, at a second flow rate substantially greater than said first flow rate.

The invention permits achieving the previously mentioned objectives.

Thus, if it is desired to give complete protection to the aircraft, it is necessary to render inert the gas tank during the entire flight, which is to say the phases of takeoff and ascent, then cruising, and finally descent and landing.

However, the most troublesome phase, in terms of the quantity of gas to be generated, is during descent. Thus, this phase is accompanied by an increase of the atmospheric pressure and, because of this, a corresponding increase of the mass of gas contained in the volume occupied by the gaseous phase, in the fuel tank. There must thus be injected a supplemental quantity of inert gas, so as to compensate for this increase. The descent thus constitutes the determining phase, as to the dimensioning of the apparatus for generating air enriched in inert gas.

The invention seeks to provide, during the cruising phase at high altitude, air particularly enriched in inert gas, with a content greater than the theoretical content at which the risk of explosion is absent.

It should be noted that this measure however involves no significant supplemental cost. Thus, during this cruising phase, the quantity of enriched air to be produced is particularly low, because it corresponds substantially only to the replacement of consumed fuel.

According to the invention, at the end of the cruising phase, the fuel tanks of the aircraft contain air whose content of inert gas is high or, in other words, which is particularly impoverished in oxygen. Under these conditions, it is thus acceptable to inject, during the descent, air whose content of inert gas is below the theoretically safe content, mentioned above.

This air which is less enriched in inert gas, which can be obtained by dilution with ambient air, will thus be mixed with the particularly enriched air, previously injected into the fuel tank during the cruising phase. It will be seen that such mixing operation will lead to the obtention of air whose content in inert gas will be near the mentioned safe content.

By way of example, it is thus possible to provide, during the cruising phase, air containing about 2% of oxygen and, during the descent phase, air containing 12% oxygen. During descent, it is also acceptable to admit, within the fuel tank, a certain quantity of ambient air.

The fact of injecting, during descent, air whose content in inert gas is relatively low, is particularly advantageous from an economic standpoint. Thus, as this descent phase corresponds to maximum requirement for inert gas, it is possible to provide for the apparatus for generating enriched air, dimensions which are substantially reduced relative to the prior art. Thus, in the known technique, the inert gas is produced at a substantially constant content, during all of the flight.

This reduction in the size of equipment thus permits a reduction of the mass, as well as the cost of manufacture. Thus, it permits decreasing the air consumption, provided in the aircraft circuit, which decreases the performance of this latter only to a small extent.

According to other characteristics of the invention:
  the ratio between the second flow rate and the first flow rate is comprised between 2.5 and 5;
  the second content of inert gas is comprised between 86 and 95%.

The invention also has for its object a device for inerting an aircraft fuel tank, comprising: means for producing air enriched in inert gas, which can be placed in communication with a source of compressed air, internal to the aircraft, these production means being moreover placed in communication with the tank that receives the fuel, means permitting regulating the content of inert gas flowing from the outlet of the production means, and means for bringing outside air into the internal volume of the fuel tank.

BRIEF DESCRIPTION OF THE DRAWINGS

The invention will be described below, with reference to the accompanying drawing, given solely by way of non-limiting example, in which.

Figure 1:
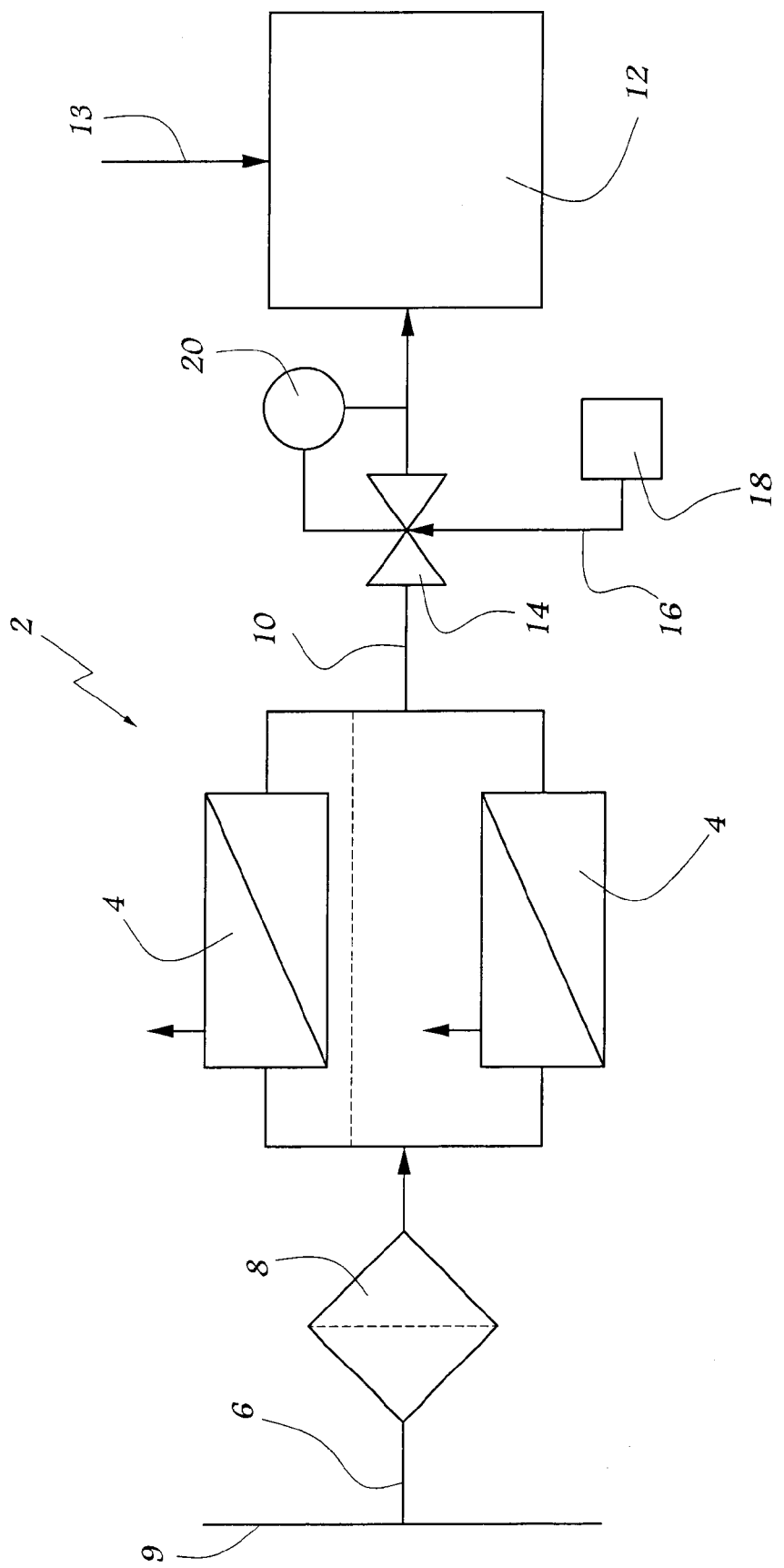
FIG. 1 is a schematic view showing a device for inerting an aircraft fuel tank, according to the invention.

The device for inerting, shown in FIG. 1, comprises an apparatus 2, adapted to produce air enriched in inert gas, in particular in nitrogen. This apparatus, which is for example according to those sold by the L'Air Liquide company, is provided with several membranes 4, disposed in parallel, relative to the direction of flow of the gas which circulates therein.

Conventionally, it is possible to cause the inert gas content to vary, which is delivered at the outlet of this apparatus. To this end, certain membranes 4 can be short-circuited, in the sense that the air admitted at the inlet of this apparatus does not flow through the membranes in question. As a modification, it is also possible to restrict the gas flow rate at the outlet, so as to increase the nitrogen content.

It is also possible to replace the membrane apparatus 2 with an apparatus for pressure swing adsorption using molecular sieves. In this hypothesis, the latter are for example according to one of those sold by the Litton company.

The apparatus 2 is hooked up by a line 6 provided with a filter 8, to a compressed air source 9, internal to the aircraft. Such a source is for example provided by the air conditioning circuit of this aircraft, or else by a withdrawal motor.

The outlet of the apparatus 2 comprises a line (not shown) within which circulates the air enriched in oxygen. This outlet also comprises a conduit 10, opening into a fuel tank 12 of the aircraft, within which circulates the air enriched in nitrogen. A line 13, in communication with the outside, permits directing ambient air into the fuel tank 12.

DETAILED DESCRIPTION OF THE INVENTION

The conduit 10 is provided with a valve 14, adapted to receive a control signal 16 from a control member 18. Moreover, a detector 20 permitting measuring the oxygen content circulating in the conduit 10, is disposed downstream of the valve 14.

The operation of the device described above will now be explained in the following.

During a phase in question of the flight of the aircraft, the valve 14 has a standard value permitting injecting into the reservoir 12 air enriched in an inert gas, with a predetermined content. Thus, in the takeoff and ascent phase of the aircraft, the enriched air admitted into the reservoir 17 via the conduit 10 has for example an oxygen content of 2%. During cruising, at a substantially constant altitude, this oxygen content of air enriched in inert gas is held constant, at 2%.

During a change in phase of the flight, the setting applied to the valve 14 is changed. To this end, a control signal 16 of the condition of the valve 14 is directed toward this latter from the control member 18. Such a signal can for example be directed by the pilot, or else be connected to the rate of descent or ascent of the aircraft, or else can be connected to differences of pressure existing between the reservoir 12 and the atmosphere.

Once the valve 14 has received this signal 16, it is automatically operated so as to permit the flow, in the conduit 10, of air enriched in nitrogen, whose content is according to the new setting.

In this respect, the detector 20, which is for example an oxygen analyzer, ensures a regulation in the closed circuit of this oxygen content or, in other words, of inert gas. To this end, this detector 20 transmits an order to the valve 14, which continuously changes the different parameters of the membranes 4, so as to obtain the desired content of inert gas admitted into the fuel tank 12.

Figure 2:
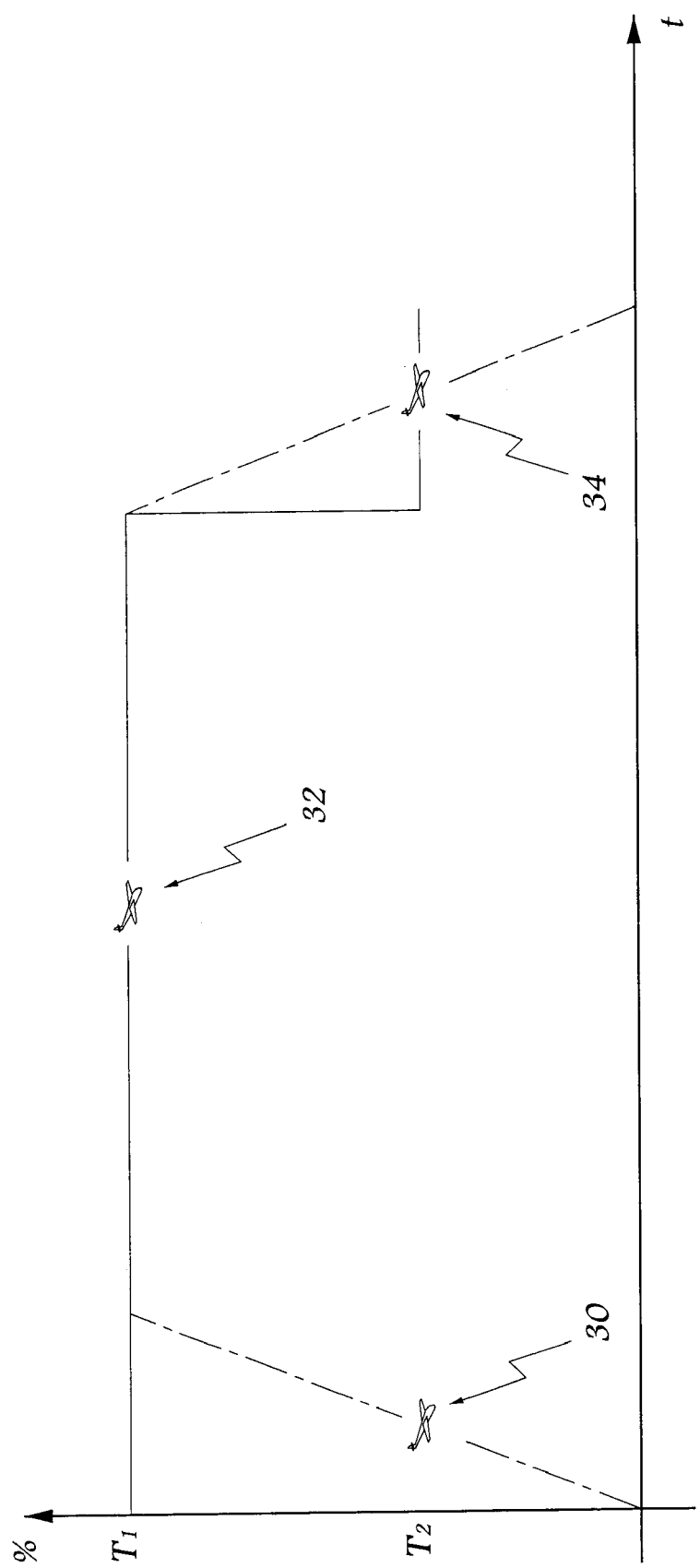
FIG. 2 is a curve showing the variations in the content of inert gas of the air injected into the fuel tank, as a function of the phase of the flight.

FIG. 2 shows the variations, as a function of the phase of the flight, of the content of inert gas, of the air injected into the fuel tank 12. On this graph are illustrated, in full lines, the variations of the content of inert gas as a function of time and, in broken lines, the variations of the altitude of the aircraft as a function of time.

During the principal phase of the flight, in other words the cruising phase, the content of inert gas is maintained at a value $T_1$ which is very high, corresponding to a very low oxygen fraction, about 1 to 2%. Similarly, at the end of this cruising phase 32, the reservoir contains, in addition to the fuel, a gaseous phase particularly impoverished in oxygen.

Then, once the descent phase 34 begins, the content of inert gas of the air injected into the fuel tank 12 is brought to a value $T_2$ substantially less than $T_1$ corresponding to the steady phase 32. This means in other words that the oxygen content of the air injected into the fuel tank, during descent 34, is substantially greater than that of the air injected during cruising phase 32.

Thus, it is acceptable to inject air whose oxygen content is about 12%, namely a value higher than that theoretically required so as to avoid any explosion of the fuel vapors. Such a possibility arises from the fact that, during the preceding phase of steady flight 32, the air exceptionally impoverished in oxygen had been injected. Similarly, the mixture resulting from the injections during phases 32 and 34 has an oxygen content below or equal to that required to be free from any risk of explosion.

The injection of air whose oxygen content is about 12%, can be carried out by admitting ambient air into the reservoir, through the line 13. Thus, it is possible to dilute, by means of this ambient air, air whose oxygen content is about 9%, provided by the apparatus 2.

During the steady phase 32, the injected air flow rate is substantially below that admitted into the fuel tank during the descent phase 34. Thus, if the parameters of operation of the apparatus 2 are considered to be fixed, such as pressure, temperature and altitude, the ratio between the second flow rate, relative to descent, and the first flow rate, relative to the steady phase, is comprised between 2.5 and 5.

Thus, during the steady phase 32, this flow rate corresponds substantially to the replacement of the consumed fuel. Moreover, during descent 34, this flow rate contributes on the one hand to replacing the consumed fuel and, on the other hand, to increase the mass of gas present in the fuel tank, so as to compensate the rise in atmospheric pressure during such a descent.

As shown in this FIG. 2, the content of inert gas of the injected air during the ascent phase 30, is about the content $T_1$ corresponding to the steady phase 32. Nevertheless, it is acceptable to inject, during this ascent phase 30, air whose content in inert gas will be greater than $T_1$.

The invention is not limited to the examples described and shown.

Thus, it is possible to inject, during the steady flight phase 32, air whose content in inert gas varies slightly as a function of the flight parameters, whilst having a value substantially greater than the safety value.

Moreover, it is acceptable to stop the injection of greatly enriched air, a little before the end of the steady phase, so as to proceed with the admission of less enriched air. It is also possible to continue the admission of greatly enriched air, at the beginning of the descent phase.

What is claimed is:

1. A process for inerting an aircraft fuel tank, which comprises:
   providing an air separation device fluidly connected to a source of air under pressure on board for producing air enriched in inert gas;
   operating the air separation device during at least a cruising phase of a flight of the aircraft to produce a first fraction of enriched air having a first inert gas content at a first flow rate;
   admitting said first fraction at said first flow rate into the fuel tank;
   operating the air separation device during a descent phase of said flight to produce a second fraction of enriched air having a second inert gas content, which is substantially smaller than said first inert gas content;
   mixing said second fraction with ambient air to obtain a mixture; and
   admitting said mixture into the fuel tank at a second flow rate, which is substantially greater than said first flow rate.

2. The process according to claim 1, wherein the first inert gas content is about 98%.

3. The process according to claim 1, wherein the ratio between the second flow rate and the first flow rate ranges between 2.5 and 5.

4. The process according to claim 1, wherein the second inert gas content ranges between 86 and 95%.

5. The process according to claim 1, wherein the content of inert gas of the enriched air is regulated as a function of a signal corresponding to the phase of the flight of the aircraft.

6. The process according to claim 1, further comprising also admitting into the fuel tank the first fraction of enriched air during an ascent phase of the flight of the aircraft.

7. Apparatus for inerting an aircraft fuel tank, which comprises:
   an air separation device fluidly connected to a source of compressed air internal to the aircraft for producing air enriched in inert gas;
   means for operating the air separation device during at least a cruising phase of a flight of the aircraft to produce a first fraction of enriched air having a first inert gas content at a first flow rate;
   means for admitting the first fraction at said first flow rate into the fuel tank;
   means for operating the air separation device during a descent phase of said flight to produce a second fraction of enriched air having a second inert gas content, which is substantially smaller than said first inert gas content;
   means for mixing said second fraction with ambient air to obtain a mixture; and
   means for admitting said mixture into the fuel tank at a second flow rate, which is substantially greater than said first flow rate.

8. The apparatus according to claim 7, further comprising a valve disposed downstream of said air separation device, said valve being structured and arranged to adjust the inert gas content, and said valve being operatively associated to a control member.

9. The apparatus according to claim 8, further comprising means for measuring the inert gas content of the air flowing downstream of the valve.

10. The apparatus according to claim 9, wherein the measuring means comprise an oxygen analyzer.

11. The apparatus according to claim 7, wherein the air separation device comprises permeation units.

12. The apparatus according to claim 7, wherein the air separation device comprises adsorption units.

* * * * *